US012568268B2

(12) United States Patent
Kim et al.

(10) Patent No.: US 12,568,268 B2
(45) Date of Patent: Mar. 3, 2026

(54) IMAGE DISPLAY DEVICE AND OPERATING METHOD THEREFOR

(71) Applicant: LG ELECTRONICS INC., Seoul (KR)

(72) Inventors: Changhoe Kim, Seoul (KR); Woojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 18/271,389

(22) PCT Filed: Jul. 12, 2021

(86) PCT No.: PCT/KR2021/008900
§ 371 (c)(1),
(2) Date: Jul. 7, 2023

(87) PCT Pub. No.: WO2022/149676
PCT Pub. Date: Jul. 14, 2022

(65) Prior Publication Data
US 2024/0022779 A1 Jan. 18, 2024

(30) Foreign Application Priority Data

Jan. 7, 2021 (KR) ........................ 10-2021-0002038

(51) Int. Cl.
*H04N 21/442* (2011.01)
*H04N 21/422* (2011.01)
(52) U.S. Cl.
CPC . *H04N 21/42203* (2013.01); *H04N 21/42201* (2013.01); *H04N 21/44218* (2013.01)

(58) Field of Classification Search
CPC ....... H04N 21/42203; H04N 21/42201; H04N 21/44218
See application file for complete search history.

(56) References Cited

U.S. PATENT DOCUMENTS 6,034,652 A     3/2000  Freiberger et al.
10,467,509 B2 * 11/2019  Albadawi ............... H04W 4/33
(Continued)

FOREIGN PATENT DOCUMENTS

JP       2004062121     2/2004
KR    1020160144400    12/2016
(Continued)

OTHER PUBLICATIONS

PCT International Application No. PCT/KR2021/008900, International Search Report dated Nov. 3, 2021, 4 pages.

*Primary Examiner* — Pinkal R Chokshi
(74) *Attorney, Agent, or Firm* — LEE, HONG, DEGERMAN, KANG & WAIMEY

(57) ABSTRACT

The present disclosure relates to an image display device and a method of operating the same. An image display device according to one embodiment of the present invention includes: a display; a plurality of microphones; a proximity sensor configured to detect an object located in a predetermined area; and a controller, wherein the controller is configured to: in response to an object corresponding to a user being detected by the proximity sensor, determine a position of the object corresponding to the user based on signals corresponding to sounds received by the plurality of microphones; and output content, corresponding to the determined position of the object corresponding to the user, through the display. Various other embodiments are possible.

15 Claims, 15 Drawing Sheets

(56)     References Cited

U.S. PATENT DOCUMENTS

| | | | |
|---|---|---|---|
| 11,032,508 B2* | 6/2021 | Kim | H04N 5/642 |
| 11,317,201 B1* | 4/2022 | Chang | H04R 3/005 |
| 2011/0069940 A1* | 3/2011 | Shimy | H04N 21/42201 |
| | | | 386/296 |
| 2015/0154850 A1* | 6/2015 | Fadell | G06Q 10/083 |
| | | | 340/501 |
| 2016/0037209 A1* | 2/2016 | Miyoshi | H04N 21/4223 |
| | | | 725/85 |
| 2016/0080510 A1* | 3/2016 | Dawoud Shenouda Dawoud | H04L 47/808 |
| | | | 709/225 |
| 2016/0127765 A1* | 5/2016 | Robinson | H04N 21/4542 |
| | | | 725/12 |
| 2017/0208363 A1* | 7/2017 | Glazier | H04N 21/41407 |
| 2018/0233142 A1* | 8/2018 | Koishida | G06F 40/35 |
| 2020/0077043 A1* | 3/2020 | Kim | G06F 1/1688 |
| 2021/0092486 A1* | 3/2021 | Lee | H04N 21/44222 |
| 2021/0132752 A1* | 5/2021 | Vukicevic | G06V 20/30 |
| 2023/0090916 A1* | 3/2023 | Yang | H04N 21/4223 |
| | | | 348/169 |
| 2024/0134193 A1* | 4/2024 | Chen | G02B 27/0172 |

FOREIGN PATENT DOCUMENTS

| | | |
|---|---|---|
| KR | 1020190081653 | 7/2019 |
| KR | 1020190108226 | 9/2019 |

* cited by examiner

FIG. 3

IMAGE DISPLAY DEVICE AND OPERATING METHOD THEREFOR

CROSS-REFERENCE TO RELATED APPLICATIONS

This application is the National Stage filing under 35 U.S.C. 371 of International Application No. PCT/KR2021/008900, filed on Jul. 12, 2021, which claims the benefit of earlier filing date and right of priority to Korean Application No. 10-2021-0002038, filed on Jan. 7, 2021, the contents of which are all incorporated by reference herein in their entirety.

TECHNICAL FIELD

The following description relates to an image display device and a method of operating the same.

BACKGROUND ART

Home appliances are devices used for user convenience. In addition, the home appliances, such as an image display device, an air conditioner, a washing machine, a refrigerator, etc., which are used in specific spaces at home or office, perform their unique functions and operations by a user's manipulation. For example, the image display device is a device having a function of displaying images that can be viewed by users, and the users may watch broadcasts and the like by using the image display device.

Recently, as various sensors are provided for home appliances, research for providing users with various functions by using the sensors is being actively conducted. For example, if a proximity sensor is included in a home appliance and a user is detected by the proximity sensor, the home appliance may provide a predetermined function, and if no user is detected, the home appliance may terminate the provided function.

However, the proximity sensor merely detects a user's movement or access temporarily, such that even when the proximity sensor is installed in the image display device, it is impossible to accurately determine whether the user temporarily passes by the image display device or remains within a predetermined area where the user may view images. For this reason, the image display device has a problem in that the accuracy of providing functions according to the user's positions is reduced.

In addition, if the image display device includes a camera, a user's position and the like may be identified accurately based on images acquired by the camera, but there is a problem in that a process of acquiring the images should be repeated continuously in order to determine the user's position. In this case, relatively high power consumption is required for driving the camera compared to driving of the proximity sensor, with a large load placed on the image display device for image processing, and there is a security problem in that the repeatedly acquired images may be leaked to the outside.

DISCLOSURE OF INVENTION

Technical Problem

It is an objective of the present disclosure to solve the above and other problems.

It is another objective of the present disclosure to provide an image display device capable of determining a user's position accurately without using a camera, and providing a function corresponding to the user's position more accurately, and a method of operating the image display device.

Technical Solution

In order to achieve the above and other objectives, an image display device according to an embodiment of the present disclosure includes: a display; a plurality of microphones; a proximity sensor configured to detect an object located in a predetermined area; and a controller, wherein the controller is configured to: in response to an object corresponding to a user being detected by the proximity sensor, determine a position of the object corresponding to the user based on signals corresponding to sounds received by the plurality of microphones; and output content, corresponding to the determined position of the object corresponding to the user, through the display.

Meanwhile, a method of operating an image display device according to an embodiment of the present disclosure includes: in response to an object corresponding to a user being detected by a proximity sensor configured to detect an object located in a predetermined area, determining a position of the object corresponding to the user based on signals corresponding to sounds received by the plurality of microphones; and outputting content, corresponding to the determined position of the object corresponding to the user, through the display.

Advantageous Effects of Invention

The image display device and a method of operating the same according to the present disclosure have the following effects.

According to various embodiments of the present disclosure, a user's position may be determined accurately by using a proximity sensor and a plurality of microphones, thereby providing a function corresponding to the user's position more accurately.

In addition, according to various embodiments of the present disclosure, a user's position may be determined accurately without using a camera, thereby improving price competitiveness, reducing load in image processing, and preventing leakage of images to the outside.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF DRAWINGS

FIG. 3 is an example of an internal block diagram of a controller of FIG. 2.

MODE FOR THE INVENTION

Figure 1:
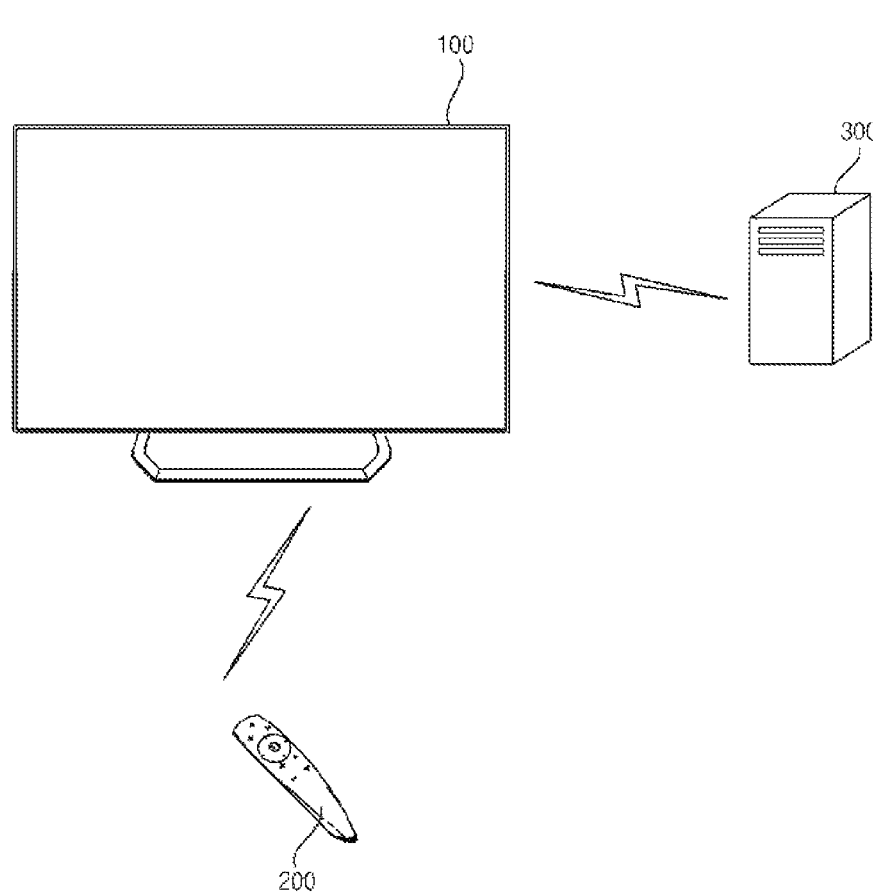
FIG. 1 is a diagram illustrating a system according to an embodiment of the present disclosure.

Hereinafter, the present disclosure will be described in detail with reference to the accompanying drawings. In order to clearly and briefly describe the present disclosure, components that are irrelevant to the description will be omitted in the drawings, and the same reference numerals are used throughout the drawings to designate the same or similar components.

The terms "module" and "unit" for elements used in the following description are given simply in view of the ease of the description, and do not have a distinguishing meaning or role. Therefore, the "module" and "unit" may be used interchangeably.

It should be understood that the terms "comprise", "include", "have", etc. when used in this specification, specify the presence of stated features, integers, steps, operations, elements, components, or combinations thereof but do not preclude the presence or addition of one or more other features, integers, steps, operations, elements, components, or combinations thereof.

It will be understood that, although the terms first, second, etc., may be used herein to describe various elements, these elements should not be limited by these terms. These terms are only used to distinguish one element from another.

FIG. 1 is a diagram illustrating a system according to various embodiments of the present disclosure.

Referring to FIG. 1, a system 10 includes an image display device 100, a remote controller 200, and/or a server 300.

The image display device 100 may be a device for processing and outputting images. The image display device 100 may be a TV, a notebook computer, a monitor, etc., and is not particularly limited as long as the image display device is capable of outputting a screen corresponding to an image signal.

The image display device 100 may receive a broadcast signal and process the received broadcast signal, and may output a signal-processed broadcast image. In the case where the image display device 100 receives the broadcast signal, the image display device 100 may serve as a broadcast receiving device.

The image display device 100 may receive the broadcast signal wirelessly through an antenna or by wire through a cable. For example, the image display device 100 may receive a terrestrial broadcast signal, a satellite broadcast signal, a cable broadcast signal, an Internet Protocol TV (IPTV) broadcast signal, and the like.

The remote controller 200 may be connected wirelessly and/or by wire to the image display device 100 to provide various control signals to the image display device 100. In this case, the remote controller 200 may include a device for establishing a wired/wireless network with the image display device 100 and for transmitting various control signals to the image display device 100 or for receiving, from the image display device 100, signals related to various operations processed by the image display device 100, through the established network.

For example, various input devices, such as a mouse, a keyboard, a pointing device, a trackball, a joystick, etc., may be used as the remote controller 200.

The image display device 100 may be connected to only a single remote controller 200 or may be simultaneously connected to two or more remote controllers 200, and may change an object displayed on a screen or adjust a screen state based on control signals provided by the respective remote controllers 200.

The image display device 100 may transmit and receive data with the server 300 via a network such as the Internet.

Through the network, the server 300 may process data received from the image display device 100 and transmit data about a processing result to the image display device 100. The server 300 may store various data about the image display device 100.

Figure 2:
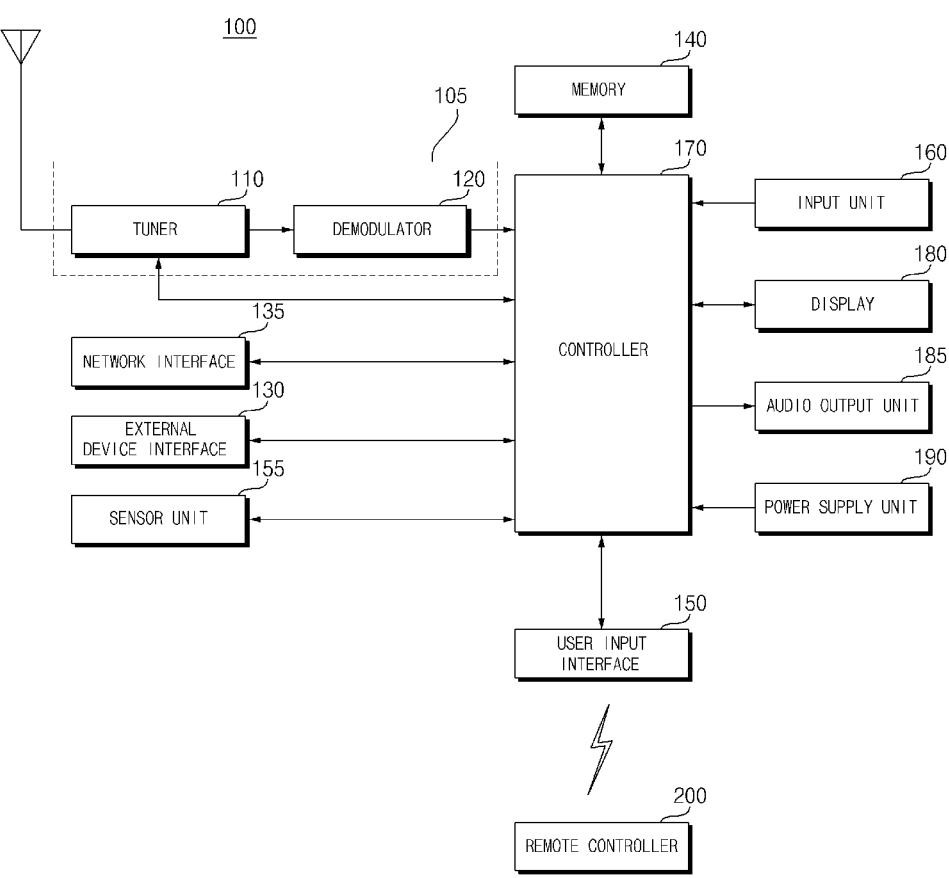
FIG. 2 is an example of an internal block diagram of an image display device of FIG. 1.

FIG. 2 is an internal block diagram of the image display device of FIG. 1.

Referring to FIG. 2, the image display device 100 may include a broadcast receiver 105, an external device interface 130, a network interface 135, a memory 140, a user input interface 150, a sensor unit 155, an input unit 160, a controller 170, a display 180, an audio output unit 185, and/or a power supply unit 190.

The broadcast receiver 105 may include a tuner 110 and a demodulator 120.

The tuner 110 may select a broadcast signal corresponding to a channel selected by a user or broadcast signals corresponding to all prestored channels from among broadcast signals received via an antenna (not shown) or a cable (not shown). The tuner 110 may convert a selected broadcast signal into an intermediate frequency (IF) signal or a baseband video or audio signal.

For example, if the selected broadcast signal is a digital broadcast signal, the tuner 110 may convert the selected broadcast signal into a digital IF signal (DIF), and if the selected broadcast signal is an analog broadcast signal, the tuner 100 may convert the selected broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

Meanwhile, the tuner 110 may sequentially select broadcast signals of all the broadcast channels stored through a channel memory function from among the received broadcast signals and may convert the selected broadcast signals into intermediate frequency (IF) signals or baseband video or audio signals.

Meanwhile, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device (not shown), e.g., the image providing device 300 illustrated in FIG. 1. To this end, the external device interface 130 may include an A/V input/output unit (not shown).

The external device interface 130 may be connected by wire/wirelessly to external devices, such as a digital versatile disc (DVD) player, a Blu-ray player, a game console, a camera, a camcorder, a computer (laptop), a set-top box, etc., and may perform input/output operations for external devices.

The A/V input/output unit may receive video and audio signals of an external device. For example, the A/V input/output unit may include an Ethernet terminal, a USB port, a composite video banking sync (CVBS) terminal, a component terminal, an S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, etc. A digital signal input through such terminals may be transmitted to the controller 170. In this case, an analogue signal input through the CVBS terminal and the S-video terminal may be converted into a digital signal by an analogue/digital conversion unit (not shown), to be transmitted to the controller 170.

The external device interface 130 may include a wireless transceiver (not shown) for short-range wireless communication with other electronic devices. The external device interface 130 may exchange data with an adjacent mobile terminal through the wireless transceiver. For example, in a mirroring mode, the external device interface 130 may receive device information, running application information, application image, and the like from the mobile terminal.

The external device interface 130 may perform short-range wireless communication using Bluetooth, Radio Frequency Identification (RFID), infrared Data Association (IrDA), Ultra-Wideband (UWB), ZigBee, and the like.

The network interface 135 may provide an interface for connecting the image display device 100 to a wired/wireless network including an Internet network.

The network interface 135 may include a communication module (not shown) for communication with the wired/wireless network 400. For example, the network interface 135 may include a communication module for Wireless LAN (WLAN; Wi-Fi), Wireless broadband (Wibro), World Interoperability for Microwave Access (Wimax), High Speed Downlink Packet Access (HSDPA), and the like.

The network interface 135 may transmit or receive data to or from other users or other electronic devices through a connected network or another network linked to the connected network.

The network interface 135 may receive web content or data provided by a content provider or a network operator. That is, the network interface 135 may receive the web content or data, such as movies, advertisements, games, VOD, broadcast signals, etc., as well as information related thereto, which are provided by content providers or network providers through the network.

The memory 140 may store programs for processing and controlling each signal within the controller 180, and may store signal-processed video, audio or data signals. For example, the memory 140 may store applications designed to perform various operations which may be processed by the controller 170, and in response to a request from the controller 170, the memory 140 may selectively provide some of the stored applications.

The programs and the like stored in the memory 140 are not particularly limited, as long as the programs may be executed by the controller 170.

The memory 140 may perform the function of temporarily storing video, audio or data signals received from an external device through the external device interface 130.

The memory 140 may store information on predetermined broadcast channels through a channel memory function, such as channel map and the like.

While FIG. 2 illustrates an example in which the memory 140 is provided separately from the controller 170, the scope of the present disclosure is not limited thereto, and the memory 140 may also be included in the controller 170.

The memory 140 may include at least one of a volatile memory (e.g., DRAM, SRAM, SDRAM, etc.) and a non-volatile memory (e.g., flash memory, hard disk type memory (HDD), solid-state drive (SSD), etc.). In various embodiments of the present disclosure, the memory 140 and the memory may be used interchangeably.

The user input interface 150 may transmit a signal, input by a user, to the controller 170 or may transmit a signal, input from the controller 170, to the user. For example, the user input interface 150 may transmit/receive a user input signal, such as power on/off, channel selection, screen setup, etc., to/from the remote controller 250, and may transmit a user input signal input through a local key (not shown), such as a power key, a channel key, a volume key, or a setup value, to the controller 170.

The sensor unit 155 may include at least one sensor.

The sensor unit 155 may include a proximity sensor configured to detect an object. The proximity sensor may be disposed inside a housing of the image display device 100 or may be disposed outside the housing of the image display device 100.

The proximity sensor may include a Passive Infrared (PIR) sensor that detects infrared radiation from an object. The PIR sensor may detect a change in infrared radiation within an angle range corresponding to a predetermined area by using the pyroelectric effect in ferroelectrics that absorb thermal energy of infrared waves, and may output a signal corresponding to the change in infrared radiation to the controller 170. Here, the pyroelectric effect may refer to a phenomenon in which a change of spontaneous polarization in ferroelectrics due to a temperature change leads to a change of surface charge in ferroelectrics.

Meanwhile, the proximity sensor may include an infrared sensor, an ultrasonic sensor, a radio frequency (RF) sensor, and the like.

The input unit 160 may be provided on one side of a main body of the image display device 100. For example, the input unit 160 may include a touchpad, a physical button, and the like.

The input unit 160 may receive various user commands associated with the operation of the image display device 100, and may transmit a control signal corresponding to the input command to the controller 170. The input unit 160 may transmit a control signal, corresponding to a received user command, to the controller 170 through the user input interface 150.

The input unit 160 may include a plurality of microphones (not shown). Each of the plurality of microphones may receive sound and may transmit a signal corresponding to the received sound to the controller 170. For example, the input unit 160 may receive a user's speech through the respective microphones.

The controller 170 may include at least one processor, and by using the included processor, the controller 170 may control the overall operation of the image display device 100. Here, the processor may be a general processor such as a central processing unit (CPU). Obviously, the processor may be a dedicated device, such as an ASIC, or other hardware-based processor.

The controller 170 may demultiplex the stream signal received from the tuner 110, the demodulator 120, the external device interface 130, or the network interface 135 into a number of signals or may process the demultiplexed signals to generate and output a signal for image or audio output.

The display 180 may convert a video signal, a data signal, an OSD signal, and a control signal processed by the controller 170 or a video signal, a data signal and a control signal received from the external device interface 130 to generate driving signals.

The display 180 may include a display panel (not shown) having a plurality of pixels.

The plurality of pixels in the display panel may include RGB sub-pixels. Alternatively, the plurality of pixels in the display panel may include RGBW sub-pixels. The display 180 may convert the video signal, data signal, OSD signal, control signal, and the like processed by the controller 170 to generate driving signals for the plurality of pixels.

The display 180 may be a Plasma Display Panel (PDP), a Liquid Crystal Display (LCD), an Organic Light Emitting Diode (OLED), a flexible display, or the like, and may also be a three-dimensional (3D) display. The 3D display 180 may be divided into an autostereoscopic display and a glasses-type display.

Further, the display 180 may be configured as a touch-screen to be used as an input device in addition to an output device.

The audio output unit 185 may receive an audio signal processed by the controller 170, and outputs the audio signal as sound. The audio output unit 185 may include at least one speaker.

The image signal, processed by the controller 170, may be input to the display 180 to be displayed as an image corresponding to the image signal. Further, the image signal processed by the controller 170 may be input to an external output device through the external device interface 130.

The audio signal processed by the controller 170 may be output as sound to the audio output unit 185. Further, the audio signal processed by the controller 170 may be input to an external output device through the external device interface 130.

Although not illustrated in FIG. 2, the controller 170 may include a demultiplexer, a video processor, etc., which will be described later with reference to FIG. 3.

Besides, the controller 170 may control the overall operation of the image display device 100. For example, the controller 170 may control the tuner 110 to tune in to a broadcast channel selected by a user or a prestored channel.

In addition, the controller 170 may control the image display device 100 according to a user command input through the user input interface 150 or an internal program.

Meanwhile, the controller 170 may control the display 180 to display images. Here, the images displayed on the display 180 may be still images or moving images and may be 2D images or 3D images.

Meanwhile, the controller 170 may control a predetermined 2D object to be displayed in an image displayed on the display 180. For example, the object may be at least one of an accessed web screen (newspaper, magazine, etc.), an electronic program guide (EPG), various menus, a widget, an icon, a still image, a moving image, and text.

Meanwhile, the image display device 100 may further include an image capturing unit (not shown). The image capturing unit may capture images of a user. The image capturing unit may be implemented with one camera, but is not limited thereto, and may also be implemented with a plurality of cameras. Further, the image capturing unit may be embedded in the image display device 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the image display device 100. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the image display device 100. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter for converting AC power into DC power and a DC/DC converter (not shown) for changing a DC power level.

The remote controller 200 transmits a user input to the user input interface 150. To this end, the remote controller 200 may use Bluetooth, radio frequency (RF) communication, infrared (IR) communication, Ultra Wideband (UWB), ZigBee, and the like. Furthermore, the remote controller 200 may receive video, audio or data signals output from the user input interface 150, and may display the received signals or output the same as sound through the remote controller 200.

Meanwhile, the block diagram of the image display device 100 illustrated in FIG. 2 is merely a block diagram for an embodiment of the present disclosure. Components of the block diagram may be integrated, added or omitted according to specifications of the actually implemented image display device 100.

That is, two or more components may be combined or one component may be divided into two or more components as needed. Furthermore, a function executed in each block is for description of an embodiment of the present disclosure, and a specific operation or device of each block is not intended to limit the scope of the present disclosure.

Figure 3:
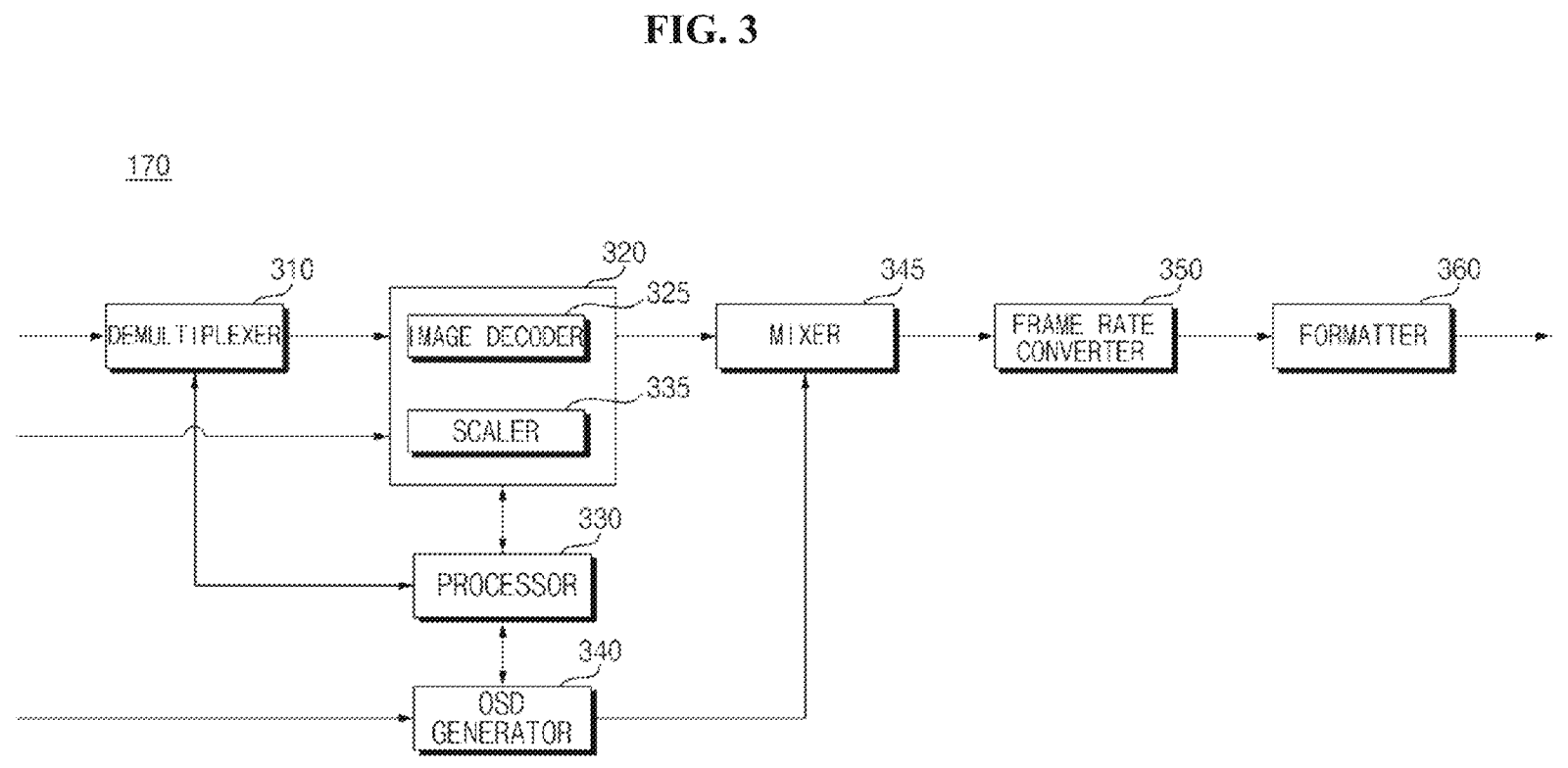

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and/or a formatter 360. Besides, the controller 170 may further include an audio processor (not shown) and a data processor (not shown).

The demultiplexer 310 demultiplexes the input stream. For example, when an MPEG-2 TS is input, the demultiplexer 310 may demultiplex the MPEG-2 TS into video, audio, and data signals, respectively. Here, the stream signal input to the demultiplexer 310 may be a stream signal output from the tuner unit 110, the demodulator 120, or the external device interface 130.

The image processor 320 may perform image processing on the demultiplexed video signal. To this end, the image processor 320 may include an image decoder 325 and a scaler 335.

The image decoder 325 decodes the demultiplexed video signal, and the scaler 335 performs scaling so that the resolution of the decoded video signal may be output to the display 180.

The image decoder 325 may include a decoder of various standards. For example, a 3D image decoder for MPEG-2, H.264 decoder, a color image, and a depth image, and a decoder for a multiple view image may be provided.

The processor 330 may control the overall operation of the image processing device 100 or the controller 170. For example, the processor 330 may control the tuner 110 to tune in to an RF broadcast channel selected by a user or a prestored channel.

In addition, the processor 330 may control the image processing device 100 by a user command input through the user input interface 150 or an internal program.

Further, the processor 330 may control data transmission with the network interface 135 or the external device interface 130.

Moreover, the processor 330 may control operations of the demultiplexer 310, the image processor 320, the OSD generator 340, and the like in the controller 170.

The OSD generator 340 generates an OSD signal according to a user input or by itself. For example, based on a user input signal input through the input unit 160, the OSD generator 340 may generate a signal for displaying a variety of information as a graphic or a text on the screen of the display 180.

The generated OSD signal may include various data such as a user interface screen of the image processing device 100, various menu screens, a widget, and an icon. In addition, the generated OSD signal may include a 2D object or a 3D object.

In addition, the OSD generator 340 may generate a pointer that may be displayed on the display, based on a pointing signal input from the remote controller 200.

The OSD generator 340 may include a pointing signal processing unit (not shown) for generating a pointer. The pointing signal processing unit (not shown) may be provided separately, rather than being provided in the OSD generator 240.

The mixer 345 may mix an OSD signal generated by the OSD generator 340 with a decoded image signal image-processed by the image processor 320. The mixed image signal may be supplied to the frame rate converter 350.

The frame rate converter (FRC) 350 may convert the frame rate of an input image. Meanwhile, the frame rate converter 350 may also directly output the frame rate without any additional frame rate conversion.

The formatter 360 may arrange a left-eye video frame and a right-eye video frame of the 3D video signal subjected to frame rate conversion. Further, a synchronization signal Vsync may be output for opening the left-eye glass and the right-eye glass of the 3D viewing device (not shown).

Meanwhile, the formatter 360 may convert the format of an input image signal into an image signal to be displayed and output on the display 180.

In addition, the formatter 360 may change the format of a 3D image signal. For example, the formatter 360 may change the format of the 3D image signal into any one of various 3D formats such as a side by side format, a top/down format, a frame sequential format, an interlaced format, a checker box format, and the like.

Meanwhile, the formatter 360 may convert a 2D video signal into a 3D video signal. For example, the formatter 360 may detect an edge or a selectable object from the 2D video signal and separate an object according to the detected edge or the selectable object as a 3D video signal to thereby generate the 3D video signal according to a 3D video generation algorithm. In this case, the generated 3D video signal may be separated into a left-eye video signal L and a right-eye video signal R and aligned as described above.

Meanwhile, although not illustrated herein, a 3D processor (not shown) for 3-dimensional (3D) effect signal processing may be further provided following the formatter 360. Such a 3D processor (not shown) may control brightness, tint and color of a video signal for 3D effect enhancement. For example, the 3D processor (not shown) may perform signal processing for making a close-range view clear and blurring a distant view. The function of the 3D processor may be integrated with the formatter 360 or the image processor 320.

Meanwhile, the audio processor (not shown) included in the controller 170 may process a demultiplexed audio signal. To this end, the audio processor (not shown) may include various decoders.

In addition, the audio processor (not shown) included in the controller 170 may control base, treble, volume, and the like.

The data processor (not shown) included in the controller 170 may process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast through each channel.

Meanwhile, the block diagram of the controller 170 illustrated in FIG. 3 is merely a block diagram for an embodiment of the present disclosure, and components of the block diagram may be integrated, added, or omitted according to the specifications of the actually implemented controller 170.

Particularly, each of the frame rate converter 350 and the formatter 360 may be separately provided instead of being included in the controller 170, or may be provided separately as one module.

Figure 4A:
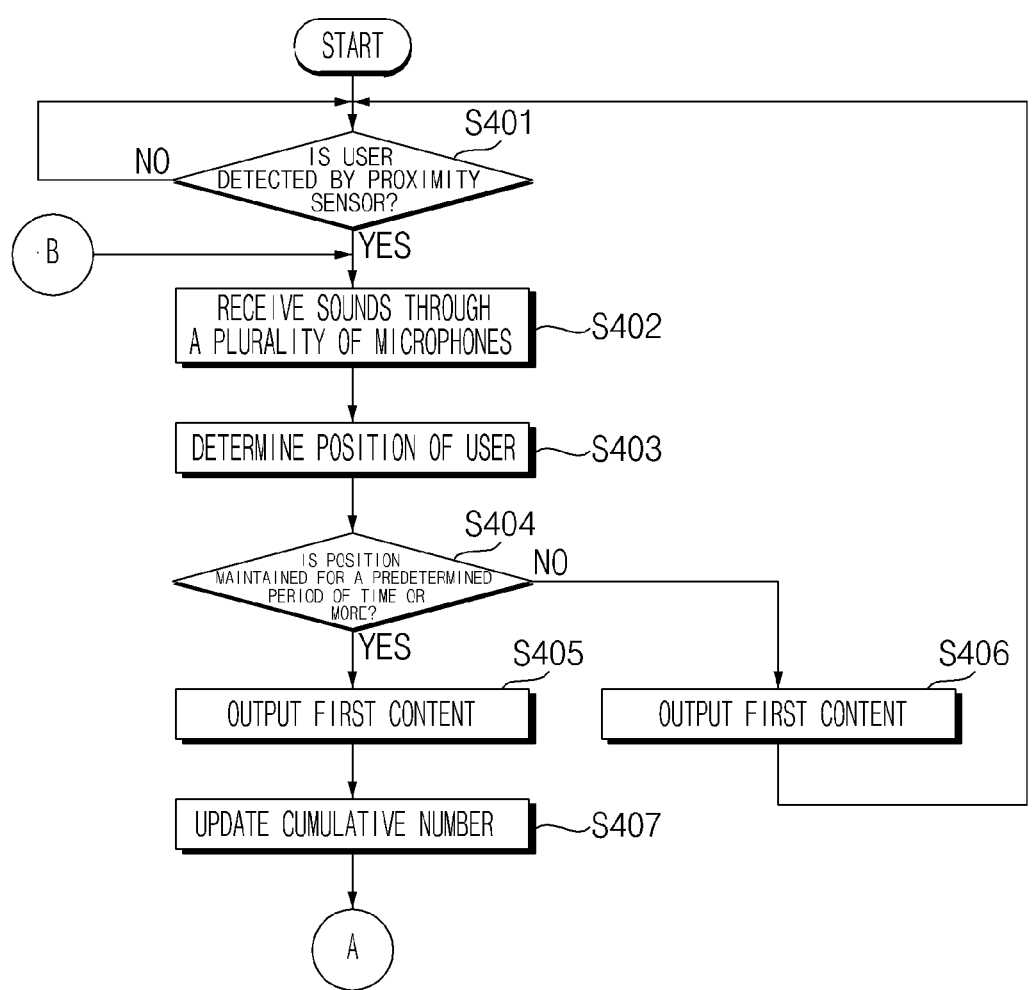
FIGS. 4A and 4B are flowcharts illustrating a method of operating an image display device according to an embodiment of the present disclosure.
Figure 4B:
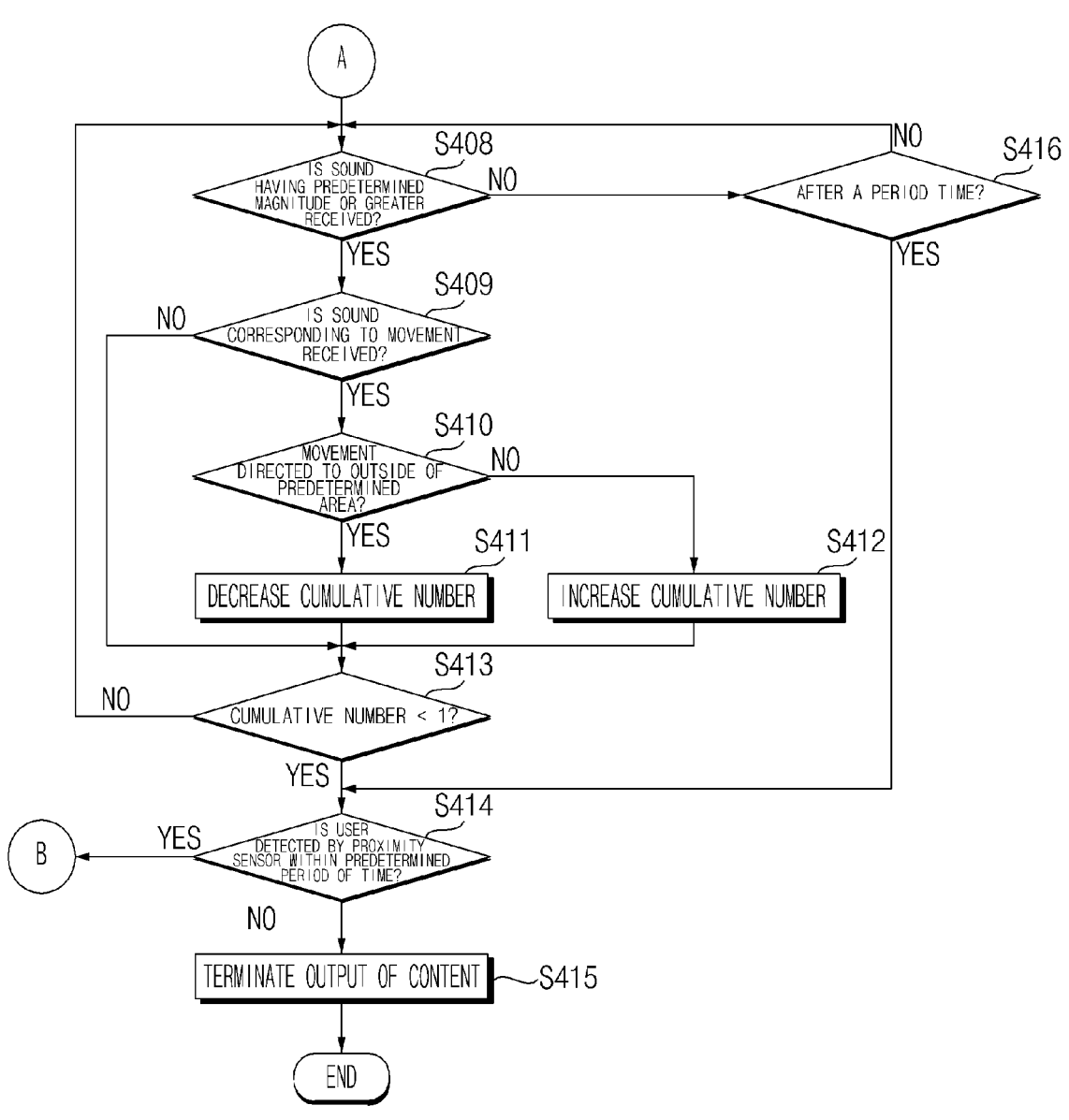

FIGS. 4A and 4B are flowcharts illustrating a method of operating an image display device according to an embodiment of the present disclosure, and FIGS. 5 to 9B are diagrams referred to in the description of operation of an image display device.

Referring to FIG. 4A, in operation S401, the image display device 100 may determine whether an object corresponding to a user is detected by a proximity sensor included in the sensor unit 155. For example, by using the PIR sensor, the image display device 100 may determine a change in infrared radiation for a predetermined area viewed from the display 180, and upon detecting that the change in infrared radiation is greater than or equal to a predetermined reference level, the image display device 100 may determine that the object corresponding to the user is detected. The following description will be given of an example in which the proximity sensor is implemented as the PIR sensor, but the present disclosure is not limited thereto.

In operations S402 and S403, upon detecting the object corresponding to the user, the image display device 100 may receive sounds through a plurality of microphones included in the input unit 160 and may determine a position of the object corresponding to the user (hereinafter referred to as a user's position) based on the received sound.

While the display 180 is turned off, the image display device 100 may stop power supply to the plurality of microphones to deactivate the plurality of microphones. In this case, while the display 180 is turned off, if the object corresponding to the user is detected by the proximity sensor, the image display device 100 may supply power to the plurality of microphones to activate the plurality of microphones and may receive sound through the plurality of microphones.

The proximity sensor and the plurality of microphones, which are included in the image display device 100, will be described with reference to FIGS. 5 and 6.

Figure 5:
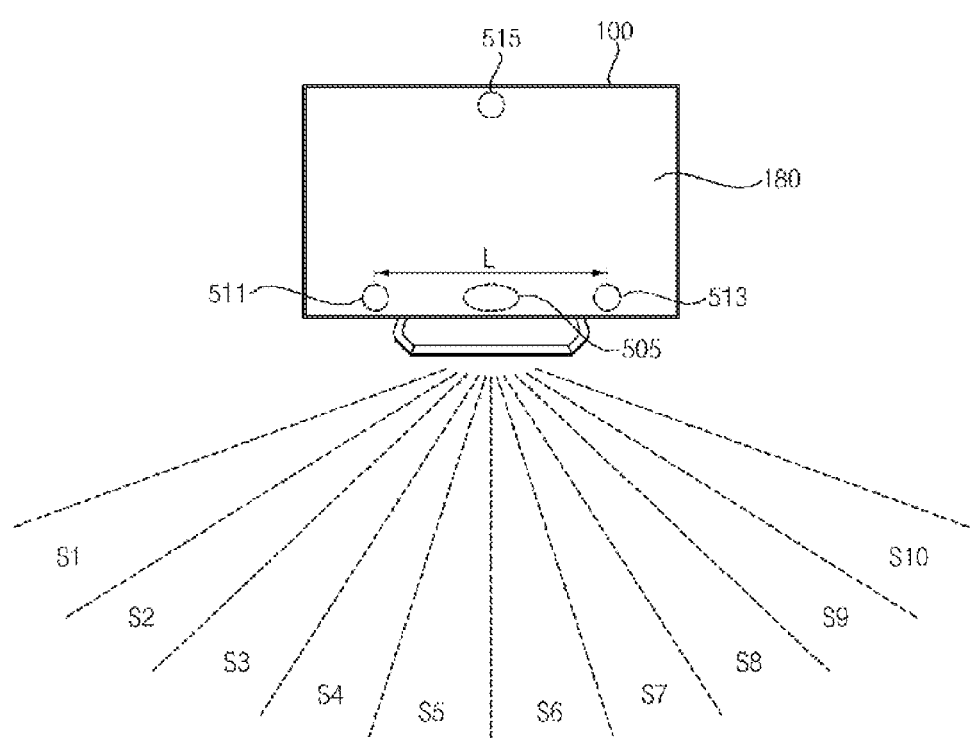
FIGS. 5 to 9B are diagrams referred to in the description of operation of an image display device.

Referring to FIG. 5, the image display device 100 may include a proximity sensor 505.

The proximity sensor 505 may detect a change in infrared radiation for a predetermined area, viewed from the display 180, in front of the image display device 100. In this case, the predetermined area detected by the proximity sensor 505 may be divided into a plurality of sub-areas S1 to S10.

The proximity sensor 505 may output a signal, corresponding to the change in infrared radiation, to the controller 170, and based on a sensing value included in the signal received from the proximity sensor 505, the controller 170 may determine whether there is a change in infrared radiation. In this case, in response to the proximity sensor 505 detecting that the change in infrared radiation is greater than or equal to a predetermined reference level, the controller 170 may determine that the object corresponding to the user is detected.

The image display device 100 may include a plurality of main microphones 511 and 513. The plurality of main microphones 511 and 513 may be horizontally spaced apart from each other by a predetermined distance L. For example, the plurality of main microphones 511 and 513 may be symmetrical about the center of the display 180. While FIG. 5 illustrates an example in which the image display device 100 includes two main microphones 511 and 513, the present disclosure is not limited thereto, and may also include three or more main microphones.

Each of the plurality of main microphones 511 and 513 may receive sound generated around the image display device 100. For example, the plurality of main microphones 511 and 513 may receive sound generated in front of the image display device 100.

Signals corresponding to the sounds received by the plurality of main microphones 511 and 513 may be transmitted to the controller 170, and the controller 170 of the image display device 100 may process the signals corresponding to the sounds received from the plurality of main microphones 511 and 513.

In this case, if audio is output by the audio output unit 185 of the image display device 100, the controller 170 may generate a first compensation signal corresponding to the audio output by the audio output unit 185. Here, the first compensation signal may refer to a signal corresponding to sound expected to be received through the plurality of main microphones 511 and 513, when the image display device 100 outputs audio through the audio output unit 185. For example, based on the generated first compensation signal, the controller 170 may remove noise, corresponding to the audio output by the audio output unit 185, from the signal corresponding to the sound received from the plurality of main microphones 511 and 513.

The image display device 100 may further include at least one sub-microphone 515. For example, the sub-microphone 515 may be disposed adjacent to an upper end of the image display device 100 and may receive sound from a direction in which the upper end of the image display device 100 is directed.

In the case where the image display device 100 includes the sub-microphone 515, the controller 170 may generate a second compensation signal based on the sound received by the sub-microphone 515. Here, the second compensation signal may refer to a signal corresponding to the sound from the direction in which the upper end of the image display device 100 is directed, e.g., a signal corresponding to noise and the like generated by a blower of an air-conditioner installed on the ceiling in a space where the image display device 100 is disposed. For example, based on the generated second compensation signal, the controller 170 may remove noise, corresponding to the sound from the direction in which the upper end of the image display device 100 is directed, from the signal corresponding to the sound received from the plurality of main microphones 511 and 513.

While the display 180 is turned off, the image display device 100 may store the sound, received by the sub-microphone 515, in the memory 140, and may generate the second compensation signal based on the sound stored in the memory 140.

Figure 6:
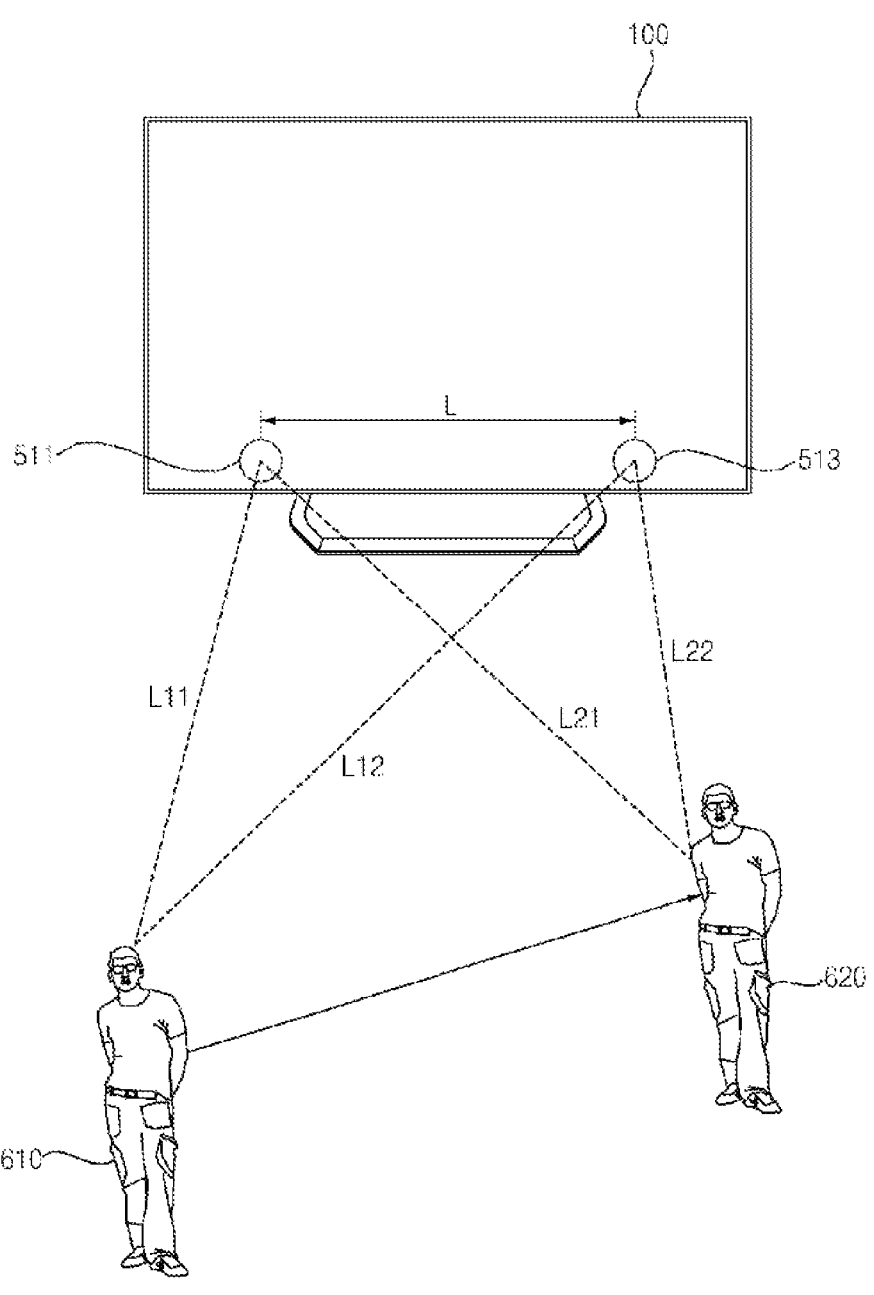

Referring to FIG. 6, the image display device 100 may determine a user's position based on the sounds received by the plurality of main microphones 511 and 513.

If the user is located at a first position 610, a distance L12 between a second main microphone 513 and the first position 610 may be larger than a distance L11 between a first main microphone 511 and the first position 610. In this case, if sound is generated from the user located at the first position 610, for example, if the user makes speech or the user's movement generates a footstep sound, a magnitude of the sound received by the first main microphone 511 may be greater than a magnitude of the sound received by the second main microphone 513.

Meanwhile, if the user is located at a second position 620, a distance L22 between the second main microphone 513 and the first position 610 may be smaller than a distance L21 between the first main microphone 511 and the first position 610. In this case, if sound is generated from the user located at the second position 620, a magnitude of the sound received by the first main microphone 511 may be smaller than a magnitude of the sound received by the second main microphone 513.

The image display device 100 may determine the user's position based on a difference between the magnitudes of the sounds received by each of the plurality of main microphones 511 and 513. For example, the image display device 100 may determine at least one of the plurality of sub-areas S1 to S10 to be a sub-area in which the object corresponding to the user is located.

The image display device 100 may determine the user's position based on a ratio of the magnitude of the sound received by the second main microphone 513 to the magnitude of the sound received by the first main microphone 511.

In addition, while the user moves from the first position 610 to the second position 620, the image display device 100 may detect the user's movement based on a sensing value of the proximity sensor 505 and/or the sounds received by the plurality of main microphones 511 and 513.

Meanwhile, the image display device 100 may identify waveforms of the sounds received by the plurality of main microphones 511 and 513 and may determine types of the waveforms. For example, the image display device 100 may identify waveforms of the sounds by using a learning model generated by learning the waveforms of sounds based on machine learning, such as deep learning and the like. In this case, based on an identified result obtained using the learning model, the image display device 100 may determine one of various types, e.g., user's footsteps, voice, laughter, etc., as a type of the waveform.

Machine learning refers to a technique which provides electronic devices the ability to learn with data and solve problems for themselves without being directly instructed by logic from a human.

Deep learning refers to an artificial intelligence technique based on Artificial Neural Networks (ANN) that enables electronic devices to think and learn for themselves like humans do. The ANN may be implemented in a software form, or in a hardware form such as a chip and the like. For example, the ANN may include various types of algorithm models, such as Deep Neural Network (DNN), Convolutional Neural Network (CNN), Recurrent Neural Network (RNN), Deep Belief Network (DBN), and the like.

Meanwhile, based on the waveforms of the sounds received by the plurality of main microphones 511 and 513, the image display device 100 may determine the number of objects corresponding to the waveforms. For example, by using a learning model that is generated by learning the waveforms of sounds, the image display device 100 may determine the number of objects that generate a footstep sound or voice as the type of waveforms.

Referring back to FIG. 4A, in operation S404, the image display device 100 may check whether the user's position is maintained in a predetermined area for a predetermined period of time or more. For example, the image display device 100 may monitor a user's position based on the sounds received by the plurality of main microphones 511 and 513, and may determine, based on a monitoring result of the user's position, whether the user's position is maintained in the predetermined area in front of the image display device 100 for the predetermined period of time or more.

If the user's position is maintained in the predetermined area for the predetermined period of time or more, the image display device 100 may output predetermined first content through the display 180 in operation S405.

Meanwhile, if the user's position moves out of the predetermined area within the predetermined period of time, the image display device 100 may output predetermined second content, different from the first content, in operation S406. In this case, the first content and the second content may be changed and set according to user input.

Figure 7A:
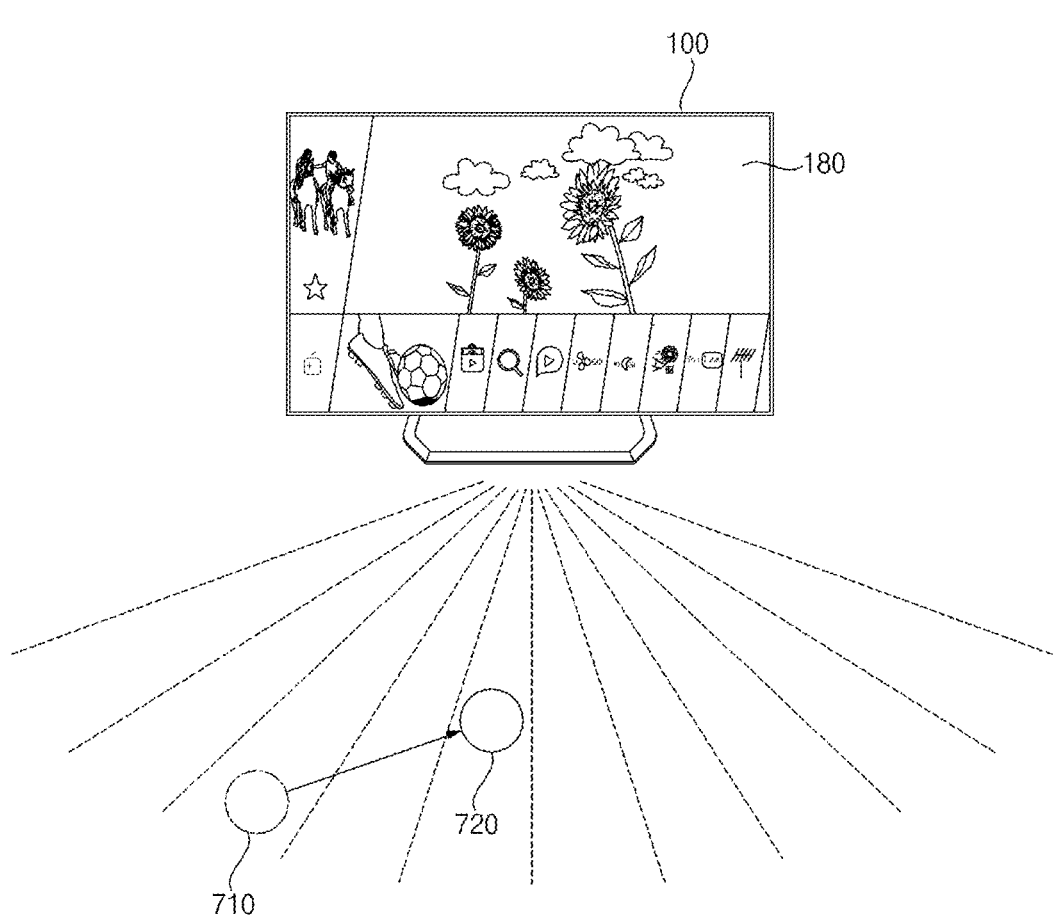
Figure 7B:
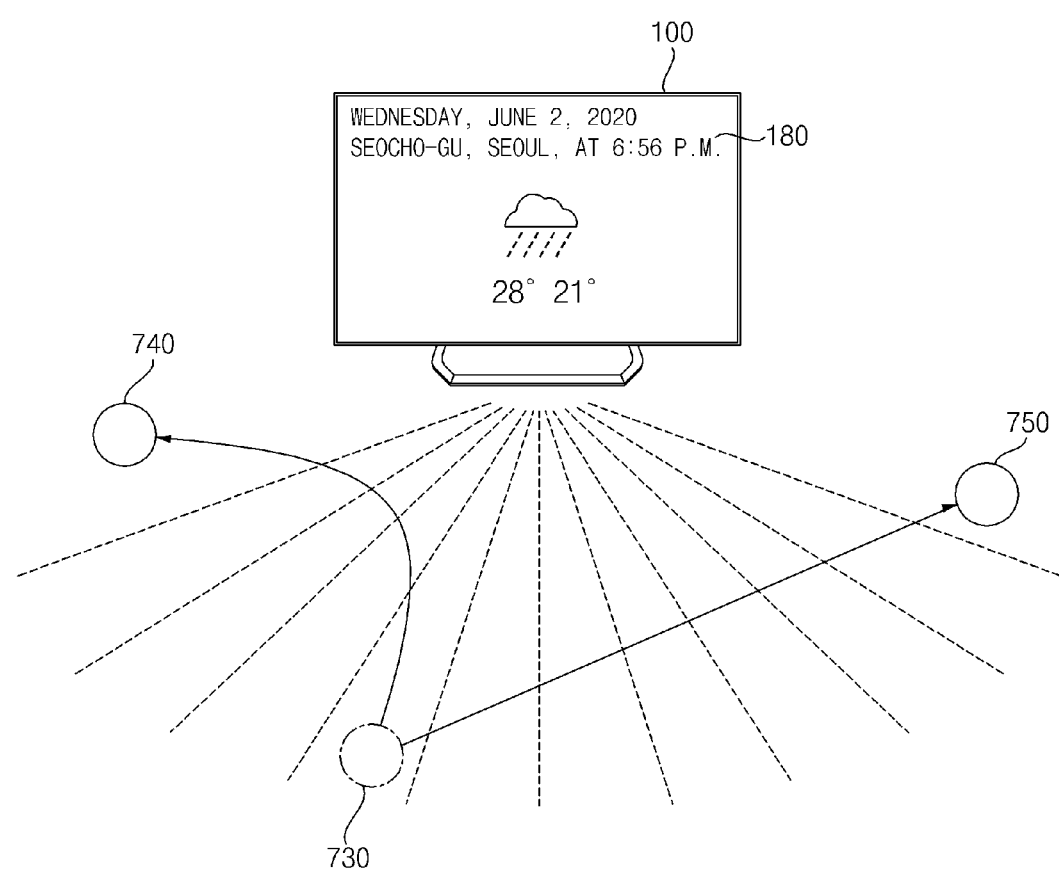

Referring to FIGS. 7A and 7B, while the display 180 is turned off, i.e., while an image is not output through the display 180, the object corresponding to the user may be detected within the predetermined area by the proximity sensor 505.

In this case, if the user's position, determined based on the sound received at a time when the object corresponding to the user is detected, is determined to be a first position 710, and if the user's position is changed from the first position 710 to a second position 720 during a predetermined period of time, the image display device 100 may determine that the user's position is maintained in the predetermined area for the predetermined period of time or more.

In addition, if the user's position is maintained in the predetermined area for the predetermined period of time or more, the image display device 100 may output a home screen, which is the predetermined first content, through the display 180.

Meanwhile, if the user's position, determined based on the sound received at a time when the object corresponding to the user is detected, is determined to be a third position 730, and if the user's position is changed from the third position 730 to a fourth position 740 or a fifth position 750 within the predetermined period of time, the image display device 100 may determine that the user's position moves out of the predetermined area within the predetermined period of time.

Further, if the user's position moves out of the predetermined area within the predetermined period of time, the image display device 100 may output a screen including current time and weather information, which is the predetermined second content, through the display 180.

Referring back to FIG. 4A, the image display device 100 may update a cumulative number of objects corresponding to the user in operation S407. For example, the image display device 100 may add the number of objects, determined based on the waveforms of sounds and corresponding to the waveforms, to the cumulative number in operation S407.

Figure 7C:
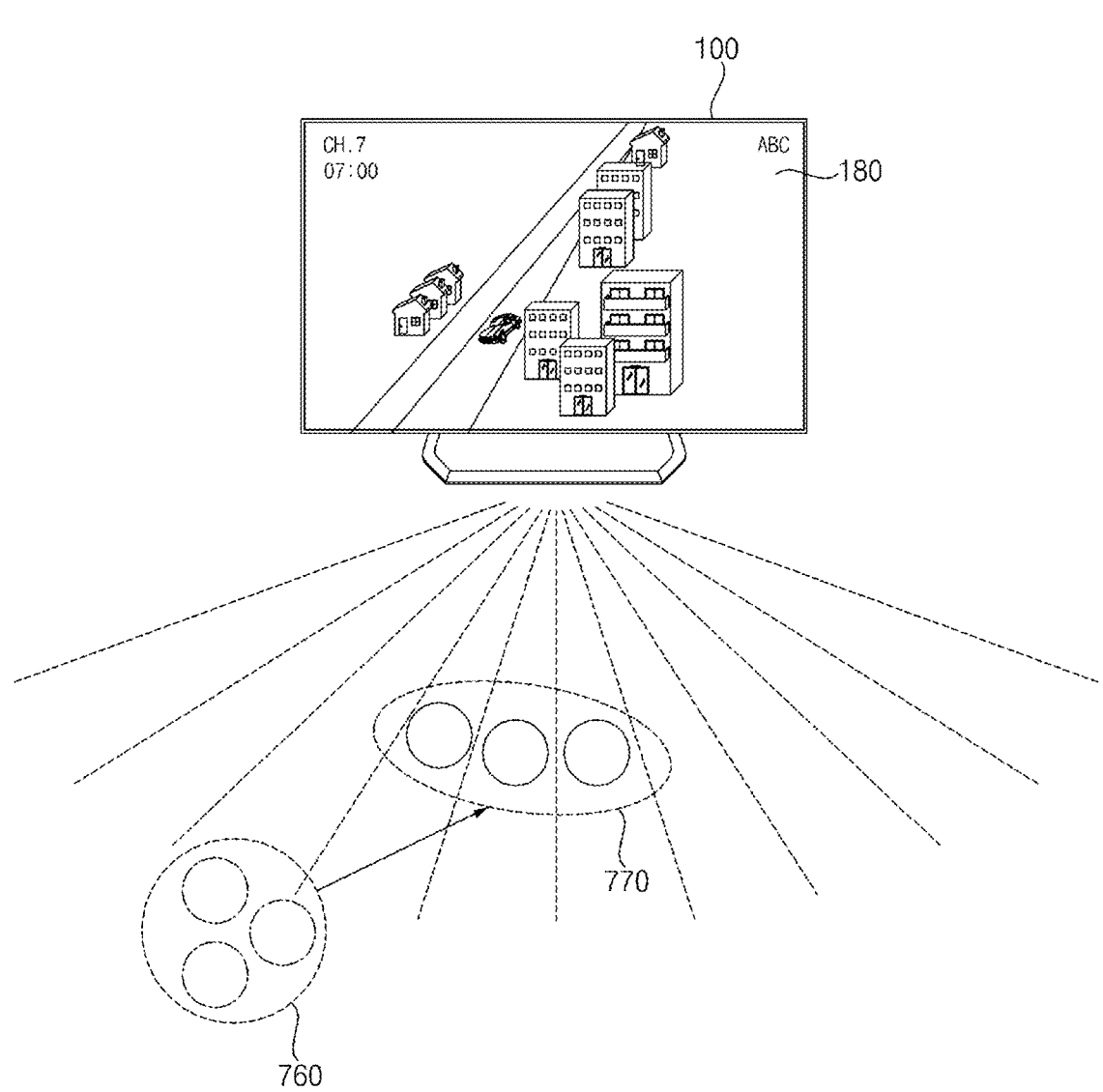

Referring to FIG. 7C if the user's position, determined based on the sound received at a time when the object corresponding to the user is detected, is determined to be a sixth position 760, and the user's position is changed from the sixth position 760 to a seventh position 770 during a predetermined period of time, the image display device 100 may determine that the user's position is maintained in the predetermined area for the predetermined period of time or more.

In addition, if the user's position is maintained in the predetermined area for the predetermined period of time or more, the image display device 100 may output a screen of broadcast content which is the predetermined first content.

In this case, the image display device 100 may determine the number of objects corresponding to the waveforms of sounds received during a predetermined period of time, and may add 3, which is the determined number of objects, to the cumulative number.

In this case, if it is impossible to determine the number of objects corresponding to the waveforms, i.e., if the number of objects that generate sound is not accurately identified, the image display device 100 may update the cumulative number based on a predetermined number (e.g., four people).

In addition, after the cumulative number is updated based on the predetermined number (e.g., four people), if the cumulative number is less than 1, i.e., if it is determined that the user is no longer located in the predetermined area, the image display device 100 may operate so that a learning model for identifying the waveforms of sounds may learn a history of the updated cumulative number. In this manner, the accuracy of the learning model for identifying the waveforms of sounds may be improved.

Meanwhile, the image display device 100 may store a previously determined position of the user in the memory 140. In this case, similarly to FIG. 7A, if the user's position is changed by the user's movement during a predetermined period of time, the image display device 100 may store a position of the user, which is finally determined based on a monitoring result of the user's position, in the memory 140.

Referring to FIG. 4B, the image display device 100 may monitor whether sound having a predetermined magnitude or greater is received by the plurality of main microphones 511 and 513 in operation S408. Here, the predetermined magnitude may be set differently according to sensitivity of the plurality of main microphones 511 and 513. In this case, if the proximity sensor 505 detects that a change in infrared radiation is greater than or equal to a predetermined reference level, the image display device 100 may determine that the sound having the predetermined magnitude or greater is received.

If the sound having the predetermined magnitude or greater is received, the image display device 100 may determine whether the received sound having the predetermined magnitude or greater corresponds to the user's movement in operation S409.

For example, if the user's position, determined corresponding to the received sound having the predetermined magnitude or greater, moves from the predetermined area to the outside of the predetermined area (hereinafter referred to as a first movement) or moves from the outside of the predetermined area into the predetermined area (hereinafter referred to as a second movement), it may be determined that the received sound having the predetermined magnitude or greater is a sound corresponding to the user's movement.

For example, if the user's position, which is determined at a time when the sound having the predetermined magnitude or greater is received, and which corresponds to the sound having the predetermined magnitude or greater, is different from the previously determined position of the user, and if the user's position corresponding to the sound having the predetermined magnitude or greater is not changed, it may be determined instead that the received sound having the predetermined magnitude or greater may be the sound corresponding to the second movement.

For example, if the user's position, which is determined at a time when the sound having the predetermined magnitude or greater is received, and which corresponds to the sound having the predetermined magnitude or greater, is the previously determined position of the user, and if the user's position is not changed, it may be determined that the received sound having the predetermined magnitude or greater is not the sound corresponding to the user's movement.

For example, if the user's position, which is determined at a time when the sound having the predetermined magnitude or greater is received, and which corresponds to the sound having the predetermined magnitude or greater, is the previously determined position of the user, and if the user's position is changed only within the predetermined area, it may be determined that the received sound having the predetermined magnitude or greater is not the sound corresponding to the user's movement.

Figure 8A:
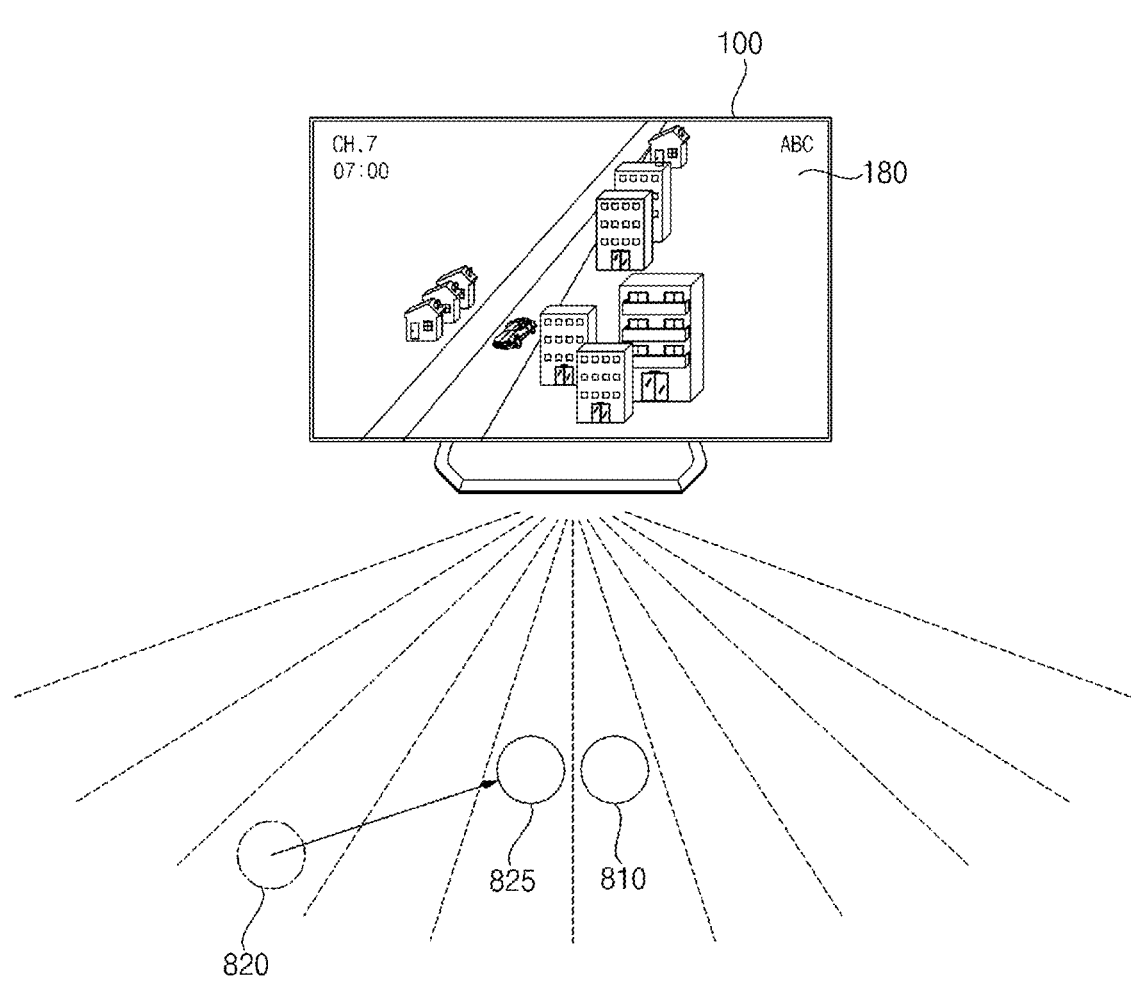

Referring to FIG. 8A, if the previously determined position of the user is a first position 810, and the cumulative number is greater than or equal to 1, the sound having the predetermined magnitude or greater may be generated at a second position 820 different from the first position 810.

In this case, based on the sounds received by the plurality of main microphones 511 and 513, the image display device 100 may determine, as a new position of the user, the second position 820 different from the first position 810 which is the previously determined position of the user.

In addition, based on the sounds received by the plurality of main microphones 511 and 513, the image display device 100 may monitor the new position of the user, and may detect a change in the new position of the user from the second position 820 to a predetermined position 825 within the predetermined area.

In this case, the image display device 100 may determine that the sounds received by the plurality of main microphones 511 and 513 and having the predetermined magnitude or greater are sounds corresponding to the user's second movement that is directed from the outside of the predetermined area into the predetermined area. In addition, the image display device 100 may also check whether the new position of the user is maintained in a predetermined area, e.g., the predetermined position 825, for a predetermined period of time or more.

Figure 8B:
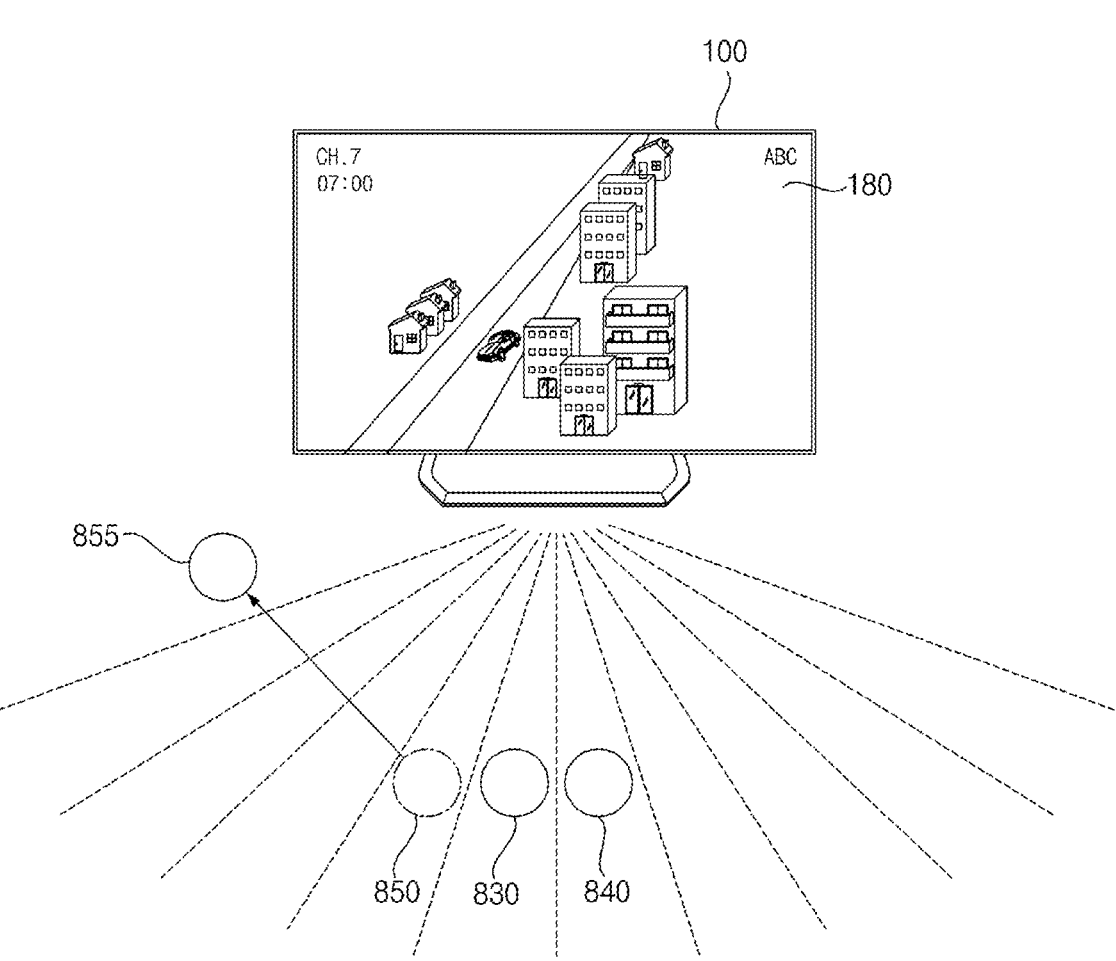

Meanwhile, referring to FIG. 8B, if the previously determined positions of the user are third to fifth positions 830, 840, and 850, and if the cumulative number is 1 or higher, the sound having the predetermined magnitude or greater may be generated at the fifth position 850 which is one of the previously determined positions of the user.

In this case, based on the sounds received by the plurality of main microphones 511 and 513, the image display device 100 may determine that the sounds are generated in a predetermined area adjacent to the previously determined position of the user.

Further, based on the sounds received by the plurality of main microphones 511 and 513, the image display device 100 may monitor a user's position corresponding to the sound having the predetermined magnitude or greater, and may detect a change in the user's position from the fifth position 850 to an outside 855 of the predetermined area.

In this case, the image display device 100 may determine that the sounds, received by the plurality of main microphones 511 and 513 and having the predetermined magnitude or greater, are sounds corresponding to the user's first movement directed from the predetermined area to the outside of the predetermined area.

Referring back to FIG. 4B, if the sound having the predetermined magnitude or greater, is the sound corresponding to the user's movement, the image display device 100 may determine whether the sound corresponds to the first movement directed from the predetermined area to the outside of the predetermined area in operation S410.

If the sound having the predetermined magnitude or greater is the sound corresponding to the first movement, the image display device 100 may decrease the cumulative number in operation S411.

Meanwhile, if the sound having the predetermined magnitude or greater is sound corresponding to the second movement, the image display device 100 may increase the cumulative number in operation S412.

In this case, based on a waveform of the sound having the predetermined magnitude or greater, the image display device 100 may identify the number of objects corresponding to the waveform, and may increase or decrease the cumulative number according to the identified number of objects.

Figure 8C:
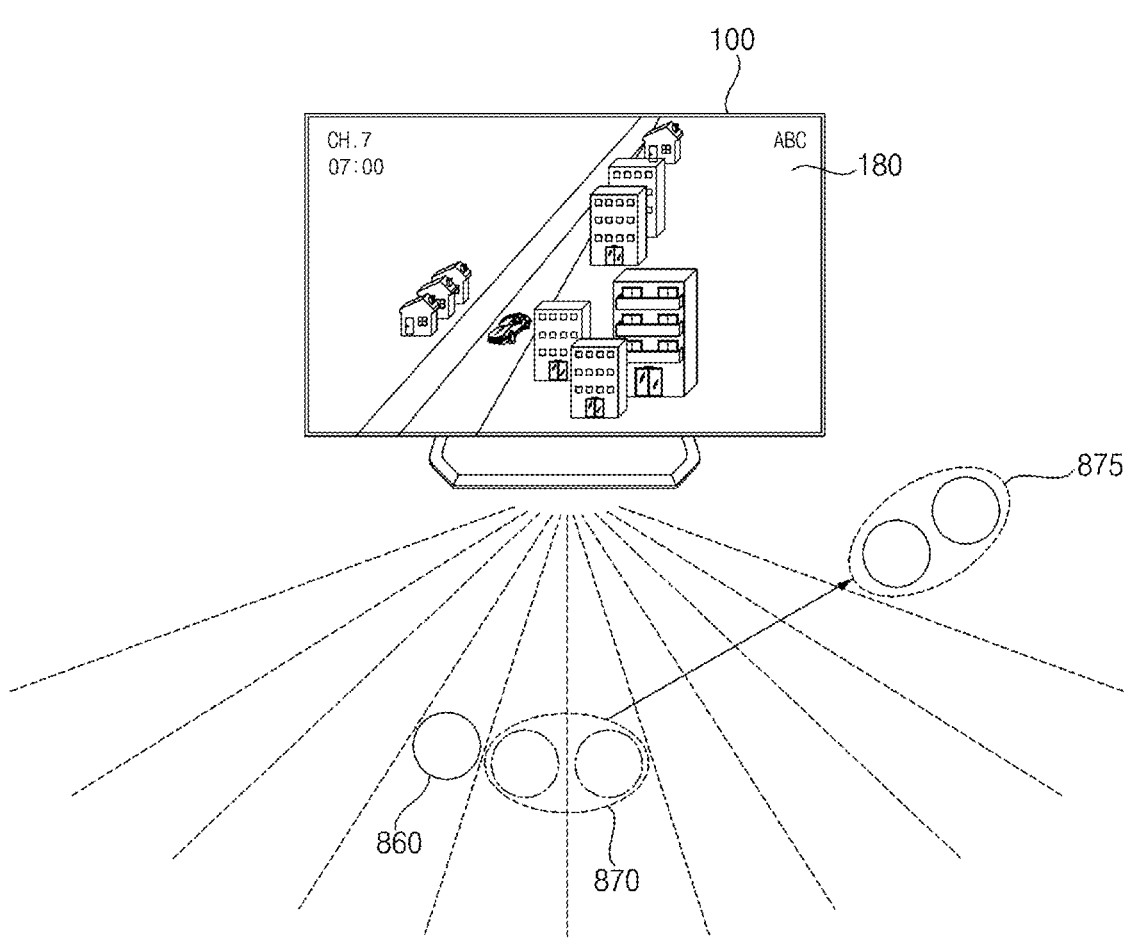

Referring to FIG. 8C, while the previously determined positions of the user are the sixth and seventh positions 860 and 870, and the cumulative number is equal to or greater than 1, the sound having the predetermined magnitude or greater may be generated at the seventh position 870 which is one of the previously determined positions of the user.

In this case, based on the sounds received by the plurality of main microphones 511 and 513, the image display device 100 may determine that the sounds are generated in a predetermined area adjacent to the previously determined position of the user.

In addition, based on the sounds received by the plurality of main microphones 511 and 513, the image display device 100 may monitor the user's position corresponding to the sound having the predetermined magnitude or greater, and may detect a change in the user's position from the seventh position 850 to an outside 875 of the predetermined area.

In this case, the image display device 100 may determine that the sounds, received by the plurality of main microphones 511 and 513 and having the predetermined magnitude or greater, are sounds corresponding to the user's first movement directed from the predetermined area to the outside of the predetermined area.

In addition, based on a waveform of the sound corresponding to the user's first movement directed from the predetermined area to the outside of the predetermined area, the image display device 100 may determine the number of objects that move out of the predetermined area, and may subtract 2, which is the determined number of objects, from the cumulative number.

Referring back to FIG. 4B, the image display device 100 may determine whether the cumulative number is less than 1 in operation S413.

If the cumulative number is greater than or equal to 1, the image display device 100 returns to operation S408 to continuously monitor whether the sound having the predetermined magnitude or greater is received by the plurality of main microphones 511 and 513.

Meanwhile, if the cumulative number is less than 1, i.e., if it is determined that the user is no longer located in the predetermined area, the image display device 100 may monitor whether an object corresponding to the user is detected by the proximity sensor 505 within a predetermined period of time in operation S414.

If the object corresponding to the user is not detected by the proximity sensor 505, the image display device 100 may terminate the output of content through the display 180 in operation S415.

Meanwhile, if the object corresponding to the user is detected by the proximity sensor 505, the image display device 100 returns to operation S402 to receive sounds through the plurality of microphones 511 and 513 and determine the user's position based on the received sounds.

Meanwhile, if the cumulative number is greater than or equal to 1, and if the sound having the predetermined magnitude or greater is not received, the image display device 100 may check in operation S416 whether a predetermined period of time elapses from a time when the sound having the predetermined magnitude or greater is not received.

If the sound having the predetermined magnitude or greater is not received during the predetermined period of time, the image display device 100 returns to operation S414 to monitor whether the object corresponding to the user is detected by the proximity sensor 505 within the predetermined period of time.

That is, even when the updated cumulative number is greater than or equal to 1, if the user is no longer located in the predetermined area, the sound having the predetermined magnitude or greater may not be generated in the predetermined area and a change in infrared radiation may not be detected. In this case, the image display device 100 may terminate the output of content through the display 180 and may initialize the cumulative number to a value of less than 1.

Figure 9A:
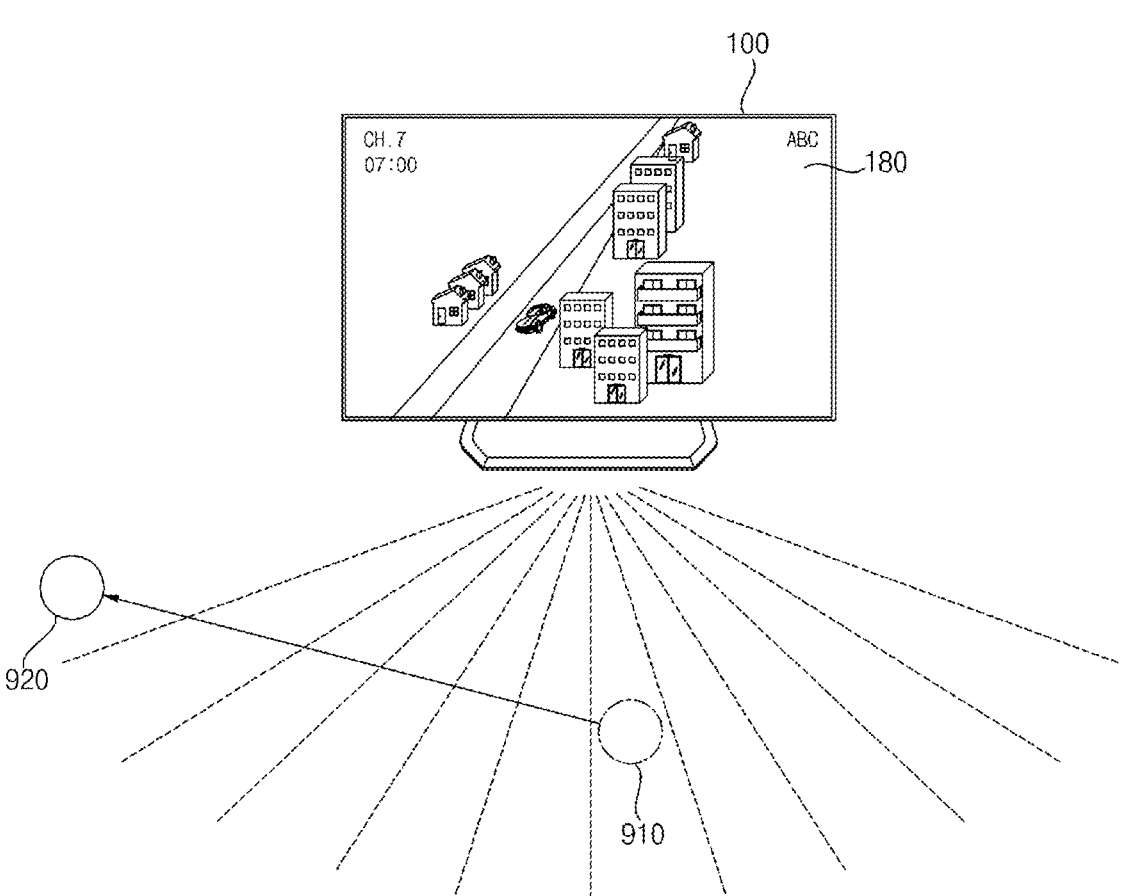

Referring to FIG. 9A, while the cumulative number of objects corresponding to the user is 1, the sound having the predetermined magnitude or greater may be generated within the predetermined area.

In this case, based on the sounds received by the plurality of main microphones 511 and 513, the image display device 100 may monitor the user's position corresponding to the sound having the predetermined magnitude or greater, and may detect a change in the user's position from a first position 910 to an outside 920 of the predetermined area.

In addition, the image display device 100 may determine that the sound, received by the plurality of main microphones 511 and 513 and having the predetermined magnitude or greater, is the sound corresponding to the user's first movement, and may subtract 1, which is the number of objects corresponding to the first movement, from the cumulative number.

Figure 9B:
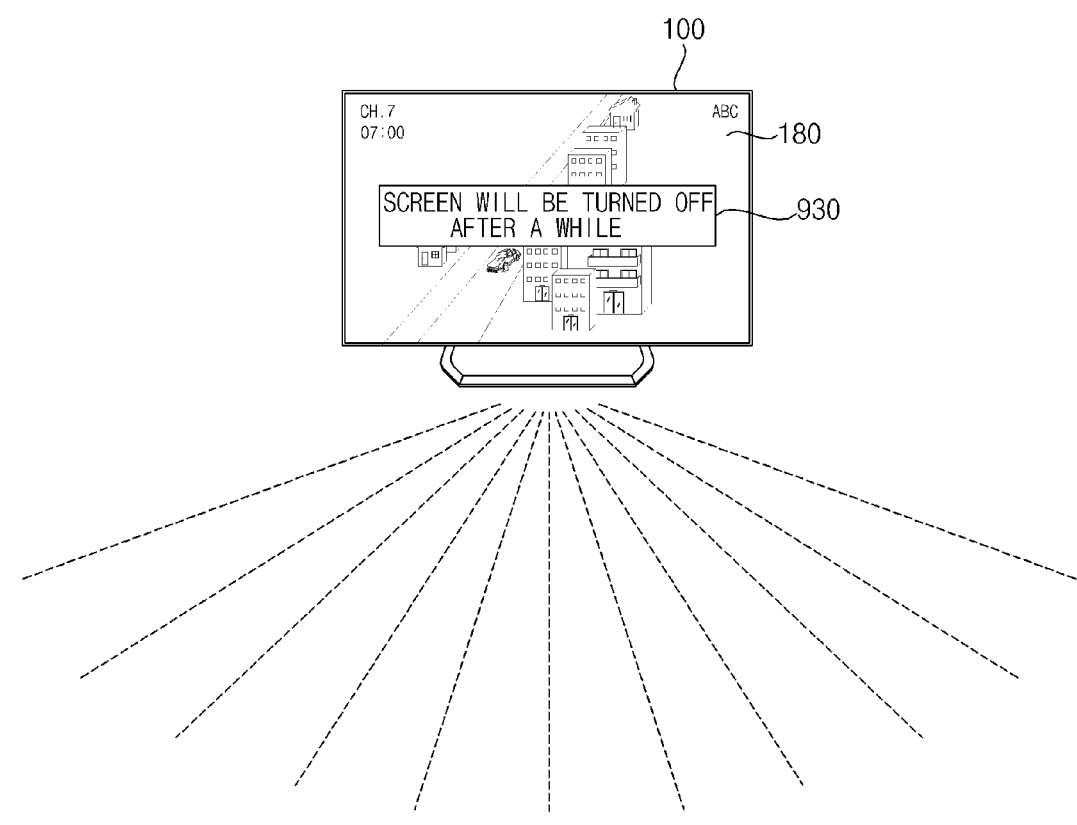

Referring to FIG. 9B, the image display device 100 may monitor whether the object corresponding to the user is detected by the proximity sensor 505 during a predetermined period of time from a time when the cumulative number is updated to a value of less than 1.

In this case, the image display device 100 may continuously output the content, which is being displayed on the display 180, during the predetermined period of time. Further, the image display device 100 may output a message 930, indicating that the output of the content is terminated, through the display 180 from the time when the cumulative number is updated to a value of less than 1.

As described above, according to various embodiments of the present disclosure, a user's position may be determined accurately by using the proximity sensor 505 and the plurality of microphones 511 and 513, thereby providing a function corresponding to the user's position more accurately.

In addition, according to various embodiments of the present disclosure, the user's position may be determined accurately without using a camera, thereby improving price competitiveness, reducing load in image processing, and preventing leakage of images to the outside.

The accompanying drawings are merely used to help easily understand embodiments of the present disclosure, and it should be understood that the technical features presented herein are not limited by the accompanying drawings. As such, the present disclosure should be construed to extend to any alterations, equivalents and substitutes in addition to those which are particularly set out in the accompanying drawings.

The method of operating the image display device of the present disclosure may be implemented as code that can be written to a processor-readable recording medium and can thus be read by a processor included in the image display device. The processor-readable recording medium may be any type of recording device in which data can be stored in a processor-readable manner. Examples of the processor-readable recording medium include a ROM, a RAM, a CD-ROM, a magnetic tape, a floppy disk, an optical data storage, and a carrier wave, e.g., data transmission over the Internet. Furthermore, the processor-readable recording medium can be distributed over a plurality of computer systems connected to a network so that processor-readable code is written thereto and executed therefrom in a decentralized manner.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

The invention claimed is:
1. An image display device comprising:
a display;
at least one microphone;
a controller,
wherein the controller is configured to:

determine a position of an object corresponding to a user located in a predetermined area based on a signal corresponding to a sound received by the at least one microphone;

based on the determined position of the object corresponding to the user being maintained in the predetermined area for a first period of time or more while the display is turned off, turn on the display and output, through the display, first content corresponding to a usage by the user of the image display device; and based on the determined position of the object corresponding to the user moving out of the predetermined area within the first period of time while the display is turned off, turn on the display and output, through the display, second content corresponding to predetermined information, wherein the second content is different from the first content.

2. The image display device of claim 1, further comprising:

a proximity sensor configured to detect the object located in the predetermined area, wherein the controller is configured to determine the position of the object corresponding to the user based on the signal corresponding to the sound received by the at least one microphone, in response to the object corresponding to the user being detected by the proximity sensor.

3. The image display device of claim 2, wherein the proximity sensor is a Passive Infrared (PIR) sensor configured to detect a change in infrared radiation.

4. The image display device of claim 2, wherein the controller is configured to:

determine the position of the object corresponding to the user based on a difference in magnitudes of sounds received by a plurality of microphones;

determine a movement of the object corresponding to the user based on the determined position of the object corresponding to the user;

update a cumulative number of the object corresponding to the user based on the determined movement of the object corresponding to the user;

in response to the cumulative number being equal to or greater than 1, continuously output the first content that is being displayed on the display; and in response to the cumulative number being less than 1, terminate the output of the first content that is being displayed on the display.

5. The image display device of claim 4, wherein the controller is configured to:

check whether a second period of time elapses from a time when the cumulative number is updated to a value of less than 1;

during the second period of time, continuously output the first content that is being displayed on the display; and based on the second period of time having elapsed, terminate the output of the first content that is being displayed on the display.

6. The image display device of claim 4, wherein the controller is configured to:

decrease the cumulative number based on the determined movement of the object corresponding to the user being a first movement directed from the predetermined area to an outside of the predetermined area; and increase the cumulative number based on the determined movement of the object corresponding to the user being a second movement that is directed from an outside of the predetermined area into the predetermined area.

7. The image display device of claim 6, wherein the controller is configured to increase the cumulative number based on the determined movement of the object corresponding to the user being the second movement, and based on the position of the object corresponding to the user and determined corresponding to the second movement being maintained in the predetermined area for the first period of time or more.

8. The image display device of claim 4, wherein the controller is configured to:

identify waveforms of the sounds received by the plurality of microphones;

based on the identified waveforms of the sounds, determine a number of the objects corresponding to the waveforms; and based on the determined number, update the cumulative number.

9. The image display device of claim 8, wherein the controller is configured to:

upon determining it is impossible to determine the number of objects corresponding to the waveforms, update the cumulative number based on a predetermined number; and upon determining the cumulative number is less than 1, train a pre-trained artificial neural network-based algorithm model for identifying the waveforms of the sounds, based on a history of the updated cumulative number.

10. The image display device of claim 4, wherein the controller is configured to:

based on the cumulative number of objects corresponding to the user being greater than or equal to 1, determine whether sounds having a magnitude equal to or greater than a predetermined magnitude are received by the plurality of microphones;

based on the sounds having the magnitude equal to or greater than the predetermined magnitude not being received, check whether a third period of time elapses from a time when the sounds having the magnitude equal to or greater than the predetermined magnitude are not received; and based on the third period of time having elapsed, terminate the output of the content that is being displayed on the display.

11. The image display device of claim 5, wherein the controller is configured to check whether the object corresponding to the user is detected by the proximity sensor during the second period of time, and based on the object corresponding to the user not being detected during the second period of time, terminate the output of the first content that is being displayed on the display.

12. The image display device of claim 10, wherein the controller is configured to:

check whether the object corresponding to the user is detected by the proximity sensor during the third period of time, and based on the object corresponding to the user not being detected during the third predetermined period of time, terminate the output of the first content that is being displayed on the display.

13. The image display device of claim 10, wherein based on the third period of time having elapsed, the controller is configured to initialize the cumulative number to a value of less than 1.

14. The image display device of claim 2, wherein the controller is configured to activate the at least one microphone, in response to the object corresponding to the user being detected by the proximity sensor while the display is turned off.

15. A method of operating an image display device, the method comprising:

determining a position of an object corresponding to a user located in a predetermined area based on a signal corresponding to a sound received by at least one microphone;

based on the determined position of the object corresponding to the user being maintained in the predetermined area for a first period of time or more while a display is turned off, turning on the display and outputting, through the display, first content corresponding to a usage by the user of the image display device; and based on the determined position of the object corresponding to the user moving out of the predetermined area within the first period of time while the display is turned off, turning on the display and outputting, through the display, second content corresponding to predetermined information, wherein the second content is different from the first content.

\* \* \* \* \*